United States Patent

[11] 3,607,700

| | | |
|---|---|---|
| [72] | Inventor | Daniel C. Tosteson<br>Orange County, N.C. |
| [21] | Appl. No. | 692,065 |
| [22] | Filed | Dec. 20, 1967 |
| [45] | Patented | Sept. 21, 1971 |
| [73] | Assignee | Duke University, Inc.<br>Durham, N.C. |

[54] ELECTRODE FOR MEASURING POTASSIUM AND OTHER SPECIFIC ION ACTIVITIES
4 Claims, 7 Drawing Figs.

[52] U.S. Cl. .................................................... 204/195, 204/1
[51] Int. Cl. ........................................................ G01n 27/30, G01n 27/40
[50] Field of Search ............................................. 204/1.1, 195; 252/500

[56] References Cited

UNITED STATES PATENTS 3,429,785  2/1969  Ross ........................... 204/1

OTHER REFERENCES

Thomas E. Andreoli et al., The Journal of General Physiology, vol. 50, No. 11, pp. 2527–2545, (1967).

Daniel C. Tosteson et al., The Journal of General Physiology, vol. 50, No. 11, pp. 2513–2525, (1967).

Duncan C. Haynes et al., Jour. Biol. Chem., vol. 244, No. 2, pp. 502–505 (1969).

Lavinia A. R. Pioda et al., Helvetica Chemica Acta, vol. 50, pp. 1373–1376, (1967).

Thomas E. Andreoli et al., The Journal of General Physiology, vol. 50, pp. 1729–1749, (1967).

A. A. Lev et al., Tsitologiya, Vol. 9, No. 1, pp. 102–106, (1967)

Paul Mueller et al., Journal of Physical Chemistry, pp. 534–535, vol. 67, (1963).

Z. Stefanac et al., Chimia, 20, p. 436, Dec. 1966.

Z. Stefanac et al., Microchemical Journal, Vol. 12, pp. 125–132, (1967).

H. K. Wipf et al., Biochemical and Biophysical Research Communications, Vol. 36, No. 3, pp. 387–393, (1969)

Paul Mueller et al., Biochemical and Biophysical Research Communications, Vol. 26, No. 4, pp. 398–404, (1967).

D. C. Tosteson et al., The Journal of General Physiology, Vol. 51, No. 5, Part 2, pp. 373–384, (1968).

*Primary Examiner*—G. L. Kaplan
*Attorney*—B. B. Olive

ABSTRACT: The direct and very rapid measurement of the activity of a particular chemical species of ion in an aqueous solution is achieved with an ion selective electrode embodying as the selective element a mechanically stable layer established between the aqueous solution and a nonaqueous phase, said layer being established by a surface active agent such as phospholipid, said layer also containing an ion selective macrocyclic compound such as valinomycin and said agent and macrocyclic compound being dissolved in a solvent which forms the nonaqueous phase. High selectivity for potassium ions, in particular, is achieved.

INVENTOR.
Daniel C. Tosteson
BY
B. B. Olive
ATTORNEY

INVENTOR.
Daniel C. Tosteson

BY

*B. B. Olm*
ATTORNEY

ELECTRODE FOR MEASURING POTASSIUM AND OTHER SPECIFIC ION ACTIVITIES

The invention described herein was made in the course of or under a grant from the National Science Foundation, an agency of the United States Government.

BACKGROUND OF THE INVENTION

1. Field of the Invention

The invention may be said to relate broadly to the measurement of the activity of a particular chemical species of ion in an aqueous solution which also contains other species. More specifically the invention relates to apparatus and associated compounds used to measure ion activity and sometimes referred to as ion electrodes, ion selective electrodes, ion activity electrodes, ion exchange membranes or electrochemical cells. The subject matter of the invention encompasses both the physical structure of such electrodes as well as the compounds and membranes employed to establish the desired specific selectivity. The invention is uniquely applicable to the measurement of potassium ion activity.

2. Description of the Prior Art

Various methods and apparatus have been employed for the measurement of ion activity. While the invention is recognized as being potentially applicable to the measurement of other ion activities, it is known to be particularly useful for the measurement of potassium ion activity. The discussion of the prior art practices is therefore limited to a discussion of prior art practices with respect to potassium ion activity. From such discussion it is believed that those skilled in the art will readily see the relation of the prior art to application of the invention to measurements of ionic activities other than potassium.

It has long been recognized that potassium ions play a vital role in many physiological processes. For example, the resting electrical potential difference (resting potential) between the inside and outside of most excitable cells e.g. nerve cells; skeletal, smooth and cardiac muscle cells) is dependent on the facts that the potassium ion concentration is much higher in the intracellular than in the extra-cellular fluid and that the surface membrane of these cells when they are at rest is much more permeable to potassium than to other cations. Indeed, the magnitude of the resting potential in such cells has been shown to depend in large part on the ratio of intracellular to extra-cellular potassium ion concentration. Since excitability is, in turn, dependent on the magnitude of the resting potential, it is evident that small changes in the concentration of potassium ions in the extra-cellular fluid have profound effects on the activity of nerve and muscle cells. For example, an increase in the concentration of potassium ions in extra-cellular fluid (e.g. blood plasma) from the normal vale of 4-5 mM to 8-9 mM can produce complete loss of excitability of cardiac muscle cells and thus cessation of the pumping action of the heart. For this and other important reasons knowledge of the concentration of potassium ions in blood plasma is of great importance to physicians in the management of many clinical disorders such as acute and chronic renal disease, endocrine diseases such as adrenal insufficiency and diabetes mellitus, disturbances of fluid balance produced by vomiting and diarrhea, circulatory shock, digitalis intoxication, etc. Therefore, the availability of a rapid, direct method for the measurement of potassium activity in biological fluids such as provided by this invention will be of great use not only in biological, physiological, biochemical and pharmacological research, but also in clinical medicine.

Potassium ion con concentrations in biological and other aqueous fluids have been measured previously by precipitation methods and by flame emission and atomic absorption photometry. These procedures require considerable sample preparation and manipulation and are therefore time consuming. Furthermore, they measure the amount of potassium ion present in the sample rather than the activity of the ion in the solution analyzed. Attempts to formulate glass electrodes which are selective for potassium ions have been carried out in a number of laboratories. If they were sufficiently selective, these electrodes would permit rapid, direct determination of potassium ion activity. However, it has provided impossible to make glass electrodes with a selectivity ratio for potassium to sodium of greater than about 10 to 1. Since the concentration of sodium ions in human blood plasma is 30 times greater than the concentration of potassium ions, these glass electrodes are not suitable for measuring potassium ion activity in such fluids.

Within the past year, several laboratories have reported that certain macrocyclic compounds, e.g., valinomycin, enniatin B, nonactin, monactin, dinactin, confer marked selectivity for potassium over sodium on thin (ca. $10^16$ cm.) lipid bilayer membranes prepared from pure lecithin, mixed brain lipids, and sheep red cell lipids. The electrical potential difference across such thin membranes responds instantaneously to changes in the ratio of potassium ion concentrations in the aqueous phases bathing the two sides of the membrane. Nevertheless such thin bilayer membranes are not suitable for the practical measurement of potassium ion activities because of their extreme mechanical fragility. However, these investigations made clear the remarkable selectivity for potassium over sodium (as great as 1000 to 1) which certain macrocyclic compounds produce in thin bilayers of phospholipid. Also within the past year a report has appeared which describes attempts to make a potassium ion sensitive electrode by filling a sintered glass disc or other supporting medium with a solution of monactin-dinactin in benzene or carbon tetrachloride. Such electrodes show striking selectivity for potassium over sodium ions but are extremely sluggish in response, requiring several hours to reach a steady potential after a change in the potassium ion activity in the test solution. These kinetic characteristics make electrodes of this type unsuitable for practical measurements of potassium ion activities.

SUMMARY OF THE INVENTION

The present invention represent an advance in the art of measuring the activity of potassium ions present in an aqueous solution together with other species of ions in several important respects. It is an improvement over precipitation and flame photometric methods in that it is rapid and direct and also in that it measures potassium ion activity rather than concentration. It is an advance over potassium selective glass electrodes in that it is much more selective for potassium ions and thus permits measurement of potassium ion activity in the presence of a large excess of sodium ions. It represents an advance over electrodes prepared by incorporating a solution of monactin-dinactin in benzene or chloroform into a sintered glass disc in that the response time is more than 100 times faster. Although the principles of operation of the present invention are similar to those operating in thin lipid bilayer membranes containing macrocyclic compounds, the present invention differs from such structures in that it provides a durable, mechanically stable, rugged system which is practicable for the measurement of potassium ion activities in aqueous solutions.

The invention is directed to ion selective electrodes which measure the activity of a particular chemical species of ion in an aqueous solution containing other species of ions, the operation of which is based on the principle that an electromotive force is developed at an interface established between the aqueous solution and a nonaqueous phase and being established by a surface active agent, said interface also containing an ion selective macrocyclic compound, said agent and compound being dissolved in a solvent which forms the nonaqueous phase, the magnitude of said electromotive force being dependent on the activity of the ion being measured, a change in said electromotive force being developed rapidly after a change in the activity of the ion in the aqueous solution, said change in electromotive force being measure by conventional means involving reversible half cells and a high impedance potentiometer. More particularly, it has been discovered that an interface established by a surface active agent such as the phospholipid lecithin, said interface also containing an ion selective macrocyclic compound such as a cyclic depsi-peptide (e.g., valinomycin) or a cyclic ester (e.g., nonactin, monactin, dinactin), gives rise to an electromotive force the magnitude of which depends on the potassium ion activity in the aqueous solution bathing one side of said interface, said interface being located at the surface of contact between said aqueous solution and nonaqueous, oil phase made up of a nonpolar solvent such as decane in which the phospholipid and macrocyclic compound are dissolved.

An object of the invention is to provide an improved selective ion electrode suited particularly to measurement of potassium ($K^+$) ion activity.

Another object is to provide an ion electrode having mechanical ruggedness and a relatively fast and highly selective response to potassium ion activity in the presence of other ions, notably sodium and hydrogen ions.

Another object is to provide a new process for forming ion selective electrodes.

Another object is to provide a new membrane forming solution for ion selective electrodes.

The foregoing and other objects will appear from the description and drawings.

DESCRIPTION OF THE PREFERRED EMBODIMENTS

Figure 1:
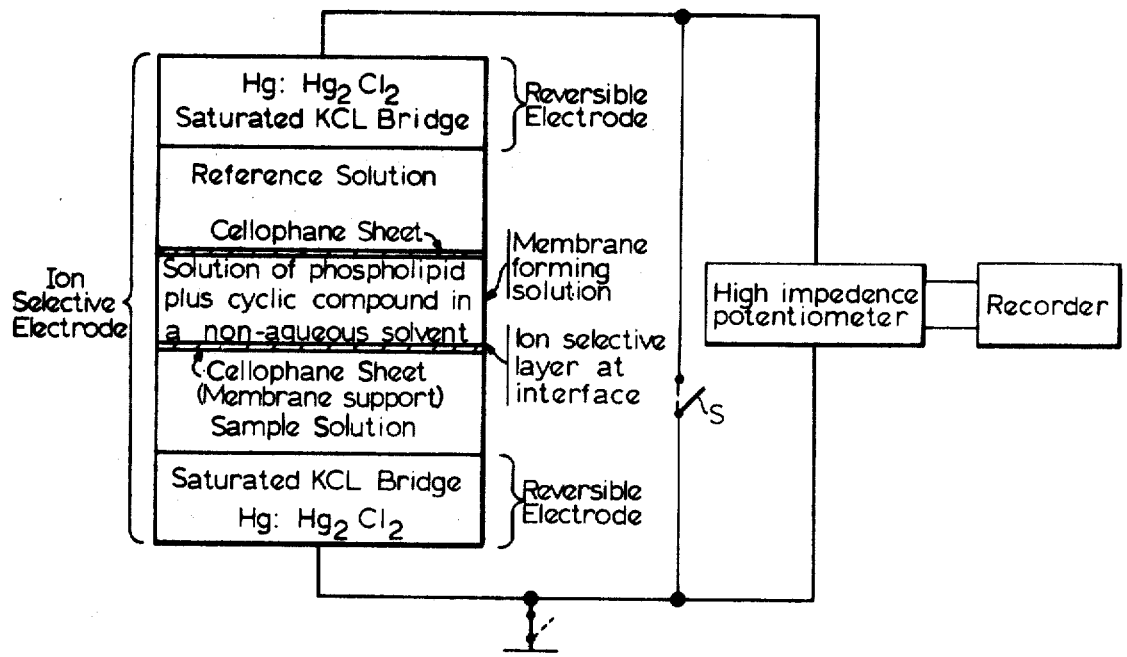
FIG. 1 is a schematic circuit diagram of an electrode measuring system embodying the invention.

In the embodiment of the invention illustrated by the circuit diagram of FIG. 1, the "electrode" of the invention may be seen to include two aqueous solutions separated by a lipid membrane forming solution consisting of a phospholipid and a macrocyclic compound dissolved in a nonaqueous phase. Electrical connections between the two aqueous solutions and the measuring instrument, a high impedance potentiometer are established through conventional reversible electrodes ($H_g:H_gClb82$ or $A_g:A_gC1$) having the usual KCl bridges. The two aqueous solutions comprise a reference solution whose ionic composition is maintained constant and a sample solution the potassium ion activity of which is to be measured. The lipid membrane forming solution to which the invention is primarily directed is, in this embodiment, confined between a pair of spaced cellophane membrane support sheets and consists of a solution of phospholipid and macrocyclic compound dissolved in a nonaqueous solvent e.g. decane, the chemical nature of the phospholipid, macrocyclic compound and solvent being later described. To complete the description of the general electrical diagram of FIG. 1, it will be noted that the reversible electrode in the sample solution which connects to one side of the potentiometer may or may not be connected to ground depending on the particular application and that the reversible electrode in the reference solution may be connected either to the other side of the potentiometer during measuring or to ground during nonmeasuring periods, a switch S being provided for this purpose.

Figure 2:
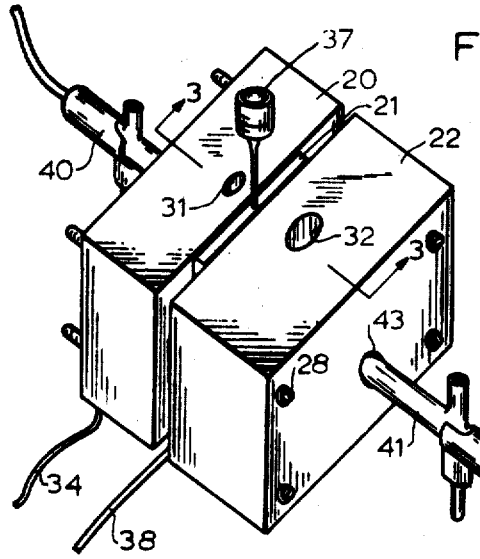
FIG. 2 is a perspective view of a chamber employed in the circuit of FIG. 1.
Figure 3:
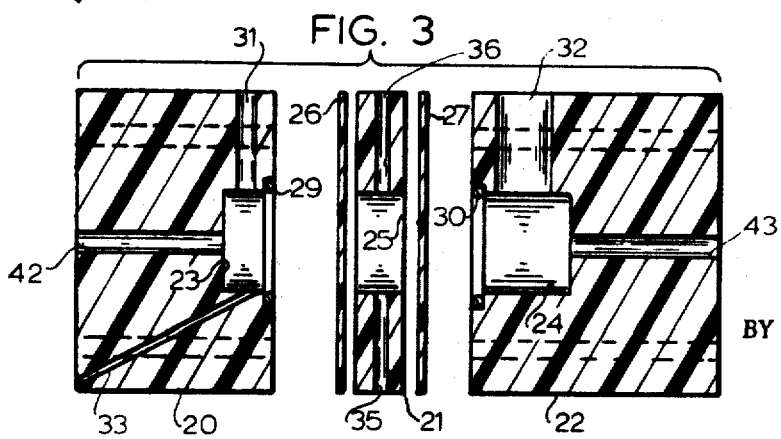
FIG. 3 is a section view of the chamber taken on line 3—3 of FIG. 2 and with the components separated.

A structure suitable to holding aqueous reference and sample solutions and the nonaqueous membrane forming solution is illustrated in FIGS. 2 and 3 in which the three block elements illustrated represent respectively three chamber blocks 20, 21, 22 which provide respectively, a chamber 23 for the sample solution, a chamber 24 for the reference solution and a chamber 25 for the phospholipid-macrocyclic compound-decane solution (hereafter called PMD solution) which establishes the desired ion selective membrane. Blocks 20, 21 and 22 may be made of various materials; while not limited to such materials it may be said generally that nonconducting, mechanically rugged plastic is suitable. It should be expected that satisfactory results will be obtained in most applications when block 21 is made of nonpolar or hydrophobic material whereas blocks 20, 22 will generally operate whether made of polar e.g. glass or nonpolar materials e.g. Lucite, Teflon, polyethylene or polypropylene. From the latter description and examples, those skilled in the art will more readily appreciate the wide choice and controlling considerations in selecting materials for the block constructions.

The size of the chambers is essentially not critical and can be said to be determined primarily by the desired convenience in handling the solutions and by the tolerable electrical resistance of the overall system. The volume of each chamber is effectively established by two membrane support sheets 26, 27 which have been recognized as serving multifold purposes. Considering that ordinary porous cellophane sheet material is suited for such purposes it can be noted that membrane support 26 in particular stabilizes the ion selective membrane formed therein, that the membrane supports permit rapid access or contact between the aqueous and nonaqueous phases and in particular permit access of the potassium ions in the sample aqueous solution to the surface of the interface with the nonaqueous PMD solution, present a polar surface and, prevent access of macromolecules, e.g. proteins, and particles, e.g. red blood cells, to the surface of the nonaqueous phase. From the multifold purposes served it can be seen that various materials may be suited to fulfilling the requirements for membrane supports 26, 27 and that cellophane presents a simple a practical choice.

The three blocks are held tightly together by means of the bolts 28. The sample solution chamber 23 and reference solution chamber 24 are recessed to receive a pair of rubber O-rings 29, 30 which assist in insuring a tight seal between the respective chambers and the two cellophane membrane supports. Passages 31, 32 provide access to the respective sample and reference chambers for the admission and removal of solutions. Where it is desired to vary a concentration of a particular sample solution as in the examples later described it is also found useful to provide a further passageway 33 having a connected tube 34. Access to the selectivity chamber 25 is provided by a lower passageway 35 and an upper passageway 36, the upper passageway 36 receiving a needle 37 and the lower passageway receiving a connecting tube 38. The conventional reversible electrodes 40, 41 mount in corresponding passages 42, 43. The reversible electrodes 40, 41 may be mounted in the dies or at an angle and may be made easily removable such that the passageways 42, 43 may also serve as a means of gaining access to the chambers.

It should of course be understood that the invention may be employed in applications where both the PMD and reference solutions may be installed by any suitable means and sealed and in a manner not requiring the particular passageways illustrated. The entire assembly shown in FIGS. 2 and 3 may be oriented differently, say turned 90° and operate equally effectively. From one of the examples to follow it will also be seen that the results of the invention may be achieved by employing only one sheet membrane support, the pores of which contain the PMD solution, clamped between blocks 20 and 22 and not using block 21 or a PMD solution chamber as such.

EXAMPLE I

An electrochemical cell was built and operated according to FIGS. 1, 2 and 3. Blocks 20 and 22 were made of Lucite and block 21 was made of Teflon. All chamber were cylindrical in shape and the interface area between chambers was approximately 0.75 cm.² and the length of the PMD solution chamber 25 was approximately 3 mm. Membrane supports 26 and 27 were formed of Union Carbide Corporation's cellophane dialysis tubing.

The reversible electrodes were calomel electrodes with KCl bridges and were of the standard Beckman fiber-junction type. A Varian potentiometric recorder was employed and was connected through a zero gain, impedance matching preamplifier, Keithly Model 300, having a nominal input impedance of $10^{13}$ ohms. Of particular importance to the invention was the nonaqueous PMD solution, which was placed in the chamber 25 which in this example was made by dissolving crude soybean lecithin (Centrolex C Lecithin, Central Soya Company) in n-decane to give a final concentration of 30 mgm. lecithin/ml. Monactin (67%) dinactin (33%) (supplied by the Squibb Research Institute) was added to the phospholipid-decane solution to give a final concentration of 0.3 mgm. of the macrocyclic ester per ml. Both the aqueous sample and reference solutions were unbuffered with a pH of 5.5 to 6.0. The $K^+$ concentration in the reference solution was 0.01 m. while the sample solutions contained different concentrations of $Na^+$ and $K^+$ within the range of those observed in human blood plasma. The electrical resistance of the lipid membrane of the invention was measured and found to be approximately $10^7$ ohms it being noted that the resistance across the whole circuit of FIG. 1 can be shown to be substantially equal to the resistance of the PMD solution between the membrane supports. Table I below shows the results obtained with three different potassium concentrations in the sample solution. Note that the voltage measured was independent of the sodium concentration at any given potassium concentration. This example illustrates the feasibility of measuring $K^+$ ion activity in solutions similar to human blood plasma and in which there is contained a large and varying excess of sodium ions.

TABLE I.—SUMMARY OF MEASUREMENTS OF POTASSIUM ACTIVITY IN SOLUTIONS SIMILAR TO HUMAN BLOOD PLASMA

| Reference solution: 0.01 MKCl sample solution, mM | | Temperature: 22° C. membrane voltage (sample solution grounded) mV |
|---|---|---|
| (Na) | (K) | |
| 150 | 2.0 | −55 |
| 140 | 2.0 | −55 |
| 130 | 2.0 | −55 |
| 150 | 4.0 | −41 |
| 140 | 4.0 | −42 |
| 130 | 4.0 | −41 |
| 150 | 6.0 | −33 |
| 140 | 6.0 | −33 |
| 130 | 6.0 | −33 |

Figure 4:
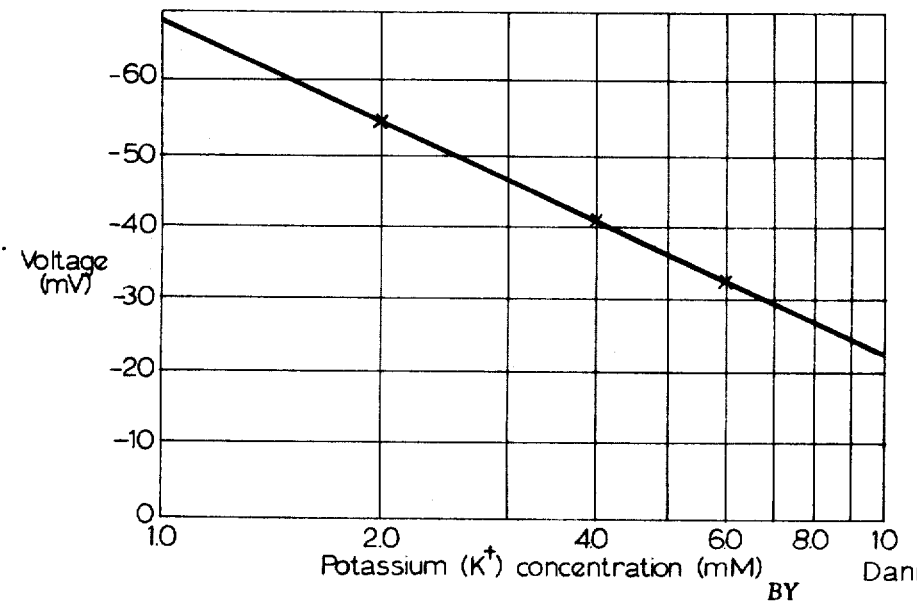
FIG. 4 is a potassium ion concentration-voltage curve for sample solutions having potassium ion concentrations within the range of human blood and blood plasma.

FIG. 4 shows a semilog plot of the data shown in Table 1 above. From this it is evident that the voltage was directly proportional to the logarithm of the potassium ion concentration in the sample solution. The slope of the line shown in FIG. 4 was 46 mv. for a 10 fold change in potassium ion concentration. The reason for the difference between this slope and the slope of 55 mv. theoretically expected for a perfect potassium electrode is not at present clear. However, since the slope shown in FIG. 4 was consistently reproducible and independent of the potassium and sodium ion concentrations, this deviation from theoretical ideal behavior in no way precludes use of the system of the invention for measurement of potassium ion activity.

Figure 5:
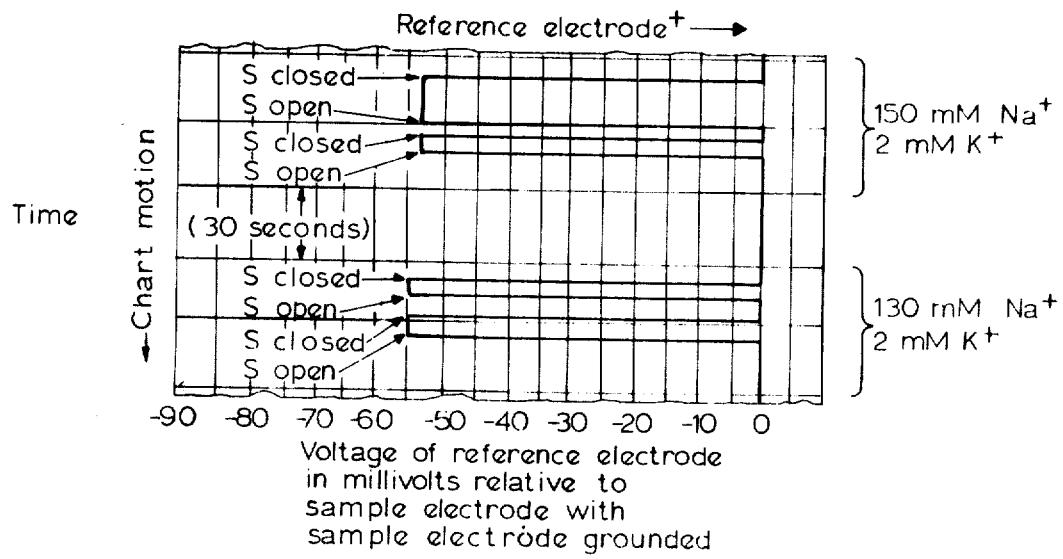
FIG. 5 is a potentiometric chart trace for sample solutions having potassium ion concentrations within the range of human blood and blood plasma.

FIG. 5 is a typical chart trace of a record produced by the potentiometric recorder during the measurements referred to in Table I and FIG. 4. FIG. 5 shows that a steady voltage was developed substantially instantaneously, within the one second response time of the recorder, after opening of the grounding switch S (FIG. 1) connected to the reference solution electrode. FIG. 5 also shows that the voltage developed was reproducible and independent of the sodium concentration.

EXAMPLE II

The conditions of Example I were repeated except that the final concentration of monactin-dinactin was only 0.003 mgm./ml. Substantially the same results were obtained.

EXAMPLE III

The conditions of Example I were repeated except that the monactin was replaced with valinomycin with no change in results.

EXAMPLE IV

Figure 6:
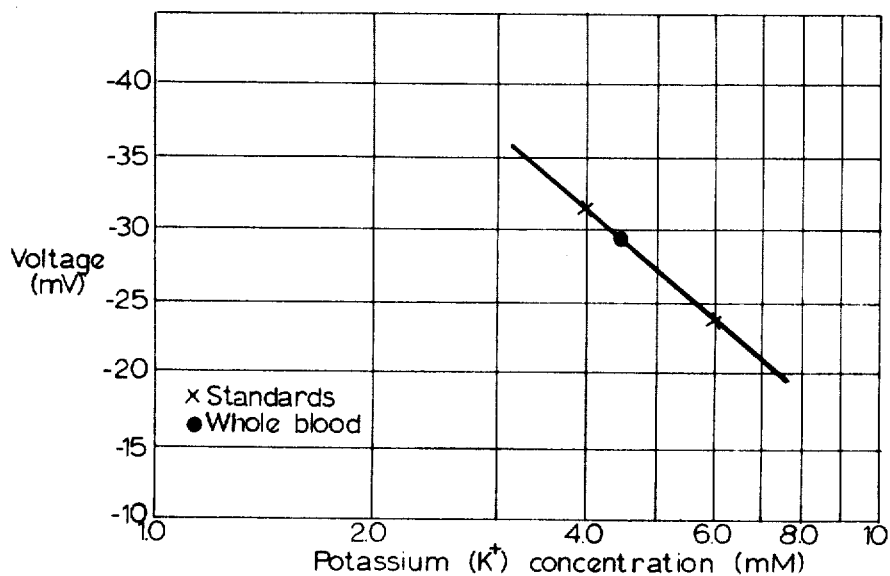
FIG. 6 is a potassium ion concentration-voltage curve for whole human blood.

The electrical arrangement of Example I was used to measure samples of human blood plasma and whole human blood. These measurements were made by comparing the voltage developed in the presence of the unknown blood and blood plasma samples with voltage developed by samples containing known concentrations of potassium ($K^+$) ions as shown in FIG. 6. The results of these measurements are summarized in Table II below which shows that the potassium ion concentrations are within the normal range and that identical results were obtained with plasma and whole blood. Thus, the presence of the formed elements of the blood e.g. red cells, white cells etc. did not affect the results.

TABLE II

MEASUREMENT OF $K^+$ CONCENTRATION IN HUMAN BLOOD AND PLASMA

| $K^+$ Concentration | mM |
|---|---|
| Whole Blood | 4.4 |
| Plasma | 4.4 |

Figure 7:
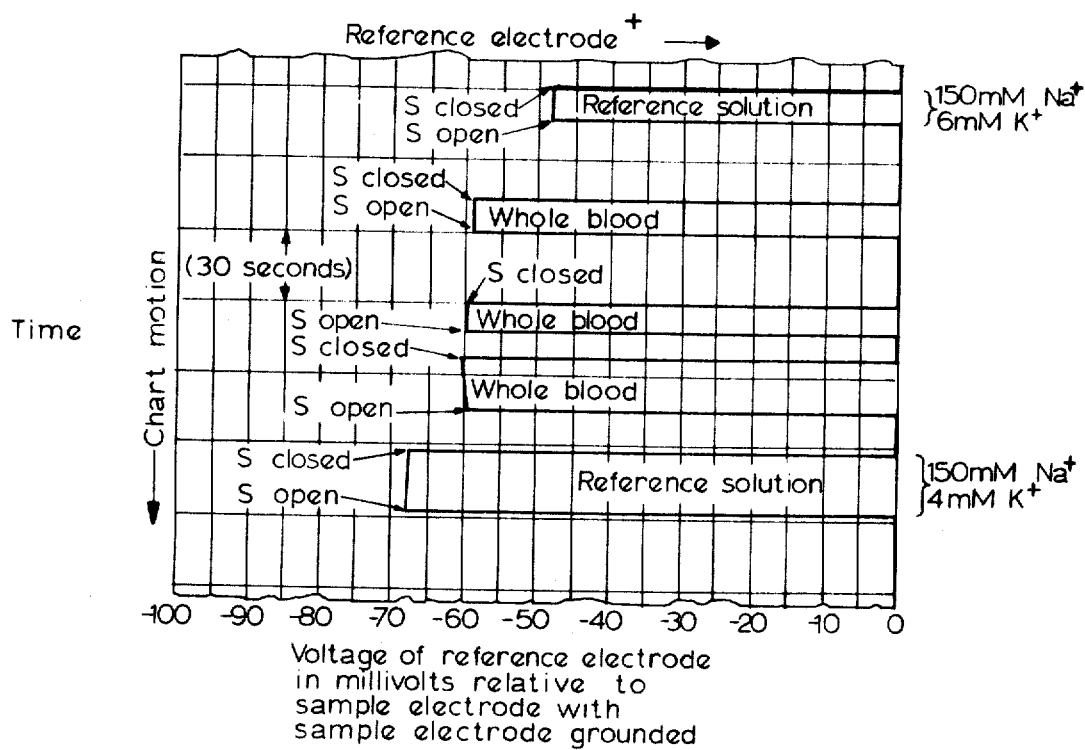
FIG. 7 is a potentiometric chart trace for whole blood and comparable reference solutions.

FIG. 7 shows a trace made by the potentiometric recorder during the measurements summarized in Table II and FIG. 6. Note that the rapidity of response and reproducibility were as satisfactory with whole blood as they were with the standard solutions which contained no protein or blood cells. This example thus indicates the feasibility of direct measurement of plasma potassium ion activity in unprocessed samples of whole human blood either in vitro or with other embodiments in vivo.

EXAMPLE V

The conditions of example I were repeated except that the portion of the electrode system previously formed by the cellophane membrane supports 26, 27, the block 21 and the described membrane forming PMD solution was instead formed by soaking a sheet of Millipore filter paper (HA, nominal pore diameter $0.45_u$) in the PMD solution described in Example I and this single sheet of soaked filter paper was clamped between the two blocks 20, 22. It should be noted that this single sheet provided support for the interface and stored the nonaqueous phase provided by the PMD solution. No substantial difference in results was noticed from those previously set forth in Example I.

OTHER EXAMPLES

In addition to the above examples, a large number of cylcic and linear peptide and depsi peptide antibiotics were tested for ionic selectivity. Macrocyclic compounds which were found to be satisfactory for the production of a practical, useful potassium ion selective electrode were the monactin series which includes nonactin, monactin, dinactin and trinactin, valinomycin and analogs having its ion selective character and enniatin B. Examples of compounds which showed inadequate selectivity included macrocyclic antibiotics, polymixin B, subtilin, streptogramin, viridogrisein, vernamycin, bacitracin, and gramicidin S; the linear peptide antibiotics gramicidin A, B, and C; the macrocyclic peptide mushroom poisons amanitin and phalloidin; and several linear and cyclic synthetic hexapeptides. The reasons for the ineffectiveness of these last mentioned compounds are not clear but are believed to involve the size of the ring, the presence of charged groups on the side chains and inadequate lipid solubility. Other phospholipids that are deemed operable include cephalins (phosphatidyl serine and phosphatidyl ethanolamine) and sphingomyelin. Other solvents that are useful to the invention include bromobenzene though here it will be readily understood by those skilled in the art that a wide range of workable solvents are available given the discovery and parameters set forth by the invention.

The mechanism by which macrocyclic compounds produce a high degree of selectivity of $K^+$ over $Na^+$ in thin and thick artificial lipid as well as intact red cell membranes is at present unclear. My working hypothesis is that the compounds exert their effects on a monolayer of phospholipid which is assumed to exist at the interface between the lipid i.e. nonaqueous and aqueous phases of these systems. It is also recognized that in the membrane forming and selectivity solution of the invention the phospholipid provides an anionic detergent having a strong polar end and a strong nonpolar end, that the $n$-decane provides a nonpolar, nonaqueous, hydrophobic, solvent and that the macrocyclic compound provides a lipid soluble compound which selectively enhances permeability to $K^+$ ions. Stated somewhat differently, the invention recognizes that the presence of what appears to be a monolayer of a surface active agent containing a macrocyclic compound when acting to separate an aqueous solution containing a potassium ion activity to be measured from a nonaqueous, hydrophobic solution will when suitably mechanically stabilized also act to provide a highly selective, rapidly responsive and rugged membrane. In whatever form the invention is employed it can be seen that the art is now provided with a rugged, reliable and extremely quick process and apparatus for measuring potassium ion activity.

What is claimed is:

1. A system for substantially instantaneously measuring the activity of selected ions in an aqueous sample solution having both the selected and other ions comprising:
   a. a first container of nonconductive material for holding said aqueous sample solution and having an open end;
   b. a first porous support sheet of hydrophilic material positioned to close said open end and be bathed by said aqueous sample solution on one side thereof;
   c. A second porous support sheet of hydrophilic material positioned opposite and laterally from said first support sheet;
   d. support means arranged to hold both said support sheets positioned so as to form a second container therebetween, said support means being formed of a nonpolar nonconductive material;
   e. a nonaqueous hydrophobic solvent containing both a surface active phospholipid agent and macrocyclic compound in a selective electrode thick layer forming solution filling said second container sufficient to cover predetermined laterally spaced and opposed areas of said first and second support sheets, said macrocyclic compound being selected from the group consisting of nonactin, monactin, dinactin and trinactin, valinomycin and enniatin B, said agent, macrocyclic compound and solvent being proportioned and located in said second container to form a bulk phase having an interface with said aqueous sample at said first membrane support sheet and which interface includes said agent and macrocyclic compound and provides a measurable voltage across said interface in substantially instantaneous response to the activity of said selected ions as well as changes in said activity, said interface and bulk phase exhibiting a sufficiently low electrical resistance to permit substantially instantaneous measurement of such voltage by taking such measurement across both said interface and bulk phase;
   f. a third container of nonconductive material containing an aqueous reference solution and having an open end adjacent the side of said second support sheet opposite the side bathing said electrode solution; and
   g. voltage measuring means arranged to contact said sample and reference solutions and to substantially instantaneously measure said voltage as a function of said activity.

2. A system as claimed in claim 1 wherein said selected ions constitute potassium ions.

3. A system as claimed in claim 1 wherein said solvent is selected from the groups consisting of decane and bromobenzene.

4. A system as claimed in claim 1 wherein said support sheets are cellophane sheets.